Dec. 11, 1956 R. A. WEST ET AL 2,773,612
APPARATUS FOR LOADING AND UNLOADING TRAILERS AND
THE LIKE ONTO AND FROM PLATFORMS AND THE LIKE
Filed June 30, 1953 6 Sheets-Sheet 1

INVENTOR
RUSSELL A WEST &
LEWIS W. EDWARDS.

BY Daniel E. Ogo
ATTORNEY

United States Patent Office 2,773,612
Patented Dec. 11, 1956

2,773,612

APPARATUS FOR LOADING AND UNLOADING TRAILERS AND THE LIKE ONTO AND FROM PLATFORMS AND THE LIKE

Russell A. West and Lewis W. Edwards, Coatesville, Pa., assignors to Lukens Steel Company, Coatesville, Pa., a corporation of Pennsylvania Application June 30, 1953, Serial No. 365,061

8 Claims. (Cl. 214—38)

This invention relates to a machine for lifting, transporting, and transferring heavy equipment and particularly to apparatus for lifting and transferring a freight-laden trailer onto and from a railroad flatcar. The apparatus shall hereinafter be described in connection with its principal intended use; namely, of handling trailers carrying freight by loading and unloading same onto and from railway flatcars, but it is to be understood that the present invention, as will be apparent, is not so limited in operation and use.

Freight transportation is a competitive business, and there is continually a need for improved means for wholesale transportation of bulk freight. Most of the transporting systems now in practice in commerce include the use of trailers and motor trucks or tractors for manipulating the trailers over short as well as long distances. Other bulk freight is transported by water, and some is carried by the railroad. The motor truck-trailer is about the most economical and efficient means known for transporting bulk freight short distances, and this is so for many reasons, such as accessibility to the consignor's premises, operating costs, and speed. Also, utilization of automotive truck-trailers where the distance between the consignor's premises and the consignee's premises are of considerable length is common and on the whole, fairly satisfactory. However, the speed, safety, and operating costs for long distance service would be improved considerably if freight-laden trailers were transported by the railroad over the long distance or hauls and by motor trucks for the short or branch hauls. This system would undoubtedly enjoy extensive use if it were not for the difficulty encountered in loading and unloading a trailer onto and from a railway car, the apparatus of the present invention being principally intended to improve and substantially alleviate this condition. Some of the more apparent disadvantages or difficulties are in positioning and maneuvering a trailer at the railroad terminal, unloading of a selected trailer from the railroad car without first unloading all of the trailers on the car or adjoining coupled cars either in front or in the rear of the selected trailer, loading a selected trailer without arranging for prior or future predetermined sequence, loading of additional trailers on coupled cars, and the generally crowded, cumbersome, and confused conditions of railroad yard and terminal operations caused by trailer tractors, trailers, and the loading and unloading equipment.

Accordingly, it is the primary object of this invention to provide an apparatus for loading and unloading a trailer of the like onto and from a railway flatcar or the like wherein the trailer may be lifted, transported bodily to adjacent the railway car, and further transported bodily longitudinally, transversely or otherwise with respect to the railway car, and deposited bodily thereon.

It is another object of this invention to provide apparatus for transporting from the ground to a railway flatcar and vice versa, a freight-laden trailer which overcomes the above difficulties and others.

A further object of this invention is to provide a machine specifically designed to pick up an automotive truck semi-trailer, place the lifted trailer on a railroad flatcar, thereafter remove the trailer from the car and generally facilitate the railroad yard and terminal operations in connection with the loading and unloading and shipment of highway semi-trailers by railroad.

Yet another object of this invention is to provide apparatus for use in lifting freight trailers or the like and loading and unloading same on and from a railway car or platform or the like wherein the trailer may be weighed for tariff purposes by suitable gauge and recording equipment provided on the apparatus and wherein the nature of the lift and transfer apparatus permits lifting, transferring, and positioning the wheels of the trailer in depressions in the deck of the flatcar which may be required by shipping regulations.

It is also an object of this invention to provide apparatus of the type previously described comprising lifting arms that are longitudinally adjustable separately or in unison respectively, thereby permitting use of the apparatus for moving different types and lengths of trailers or the like and longitudinal adjustment of the trailer on the flatcar or platform respectively.

A still further object of this invention is to provide apparatus for loading and unloading freight trailers sidewise on board a railway flatcar whereby the freight-laden trailers may be bodily loaded onto or unloaded from the cars without the necessity of uncoupling the cars, with minimum amount of operators, with considerable speed and ease, with a minimum amount of time and expense and without other than the usual standard railroad and trailer equipment.

Another object of the invention is in the provision of lifting apparatus for loading and unloading semi-trailers on and from railroad flatcars, said apparatus requiring no counterbalancing during lifting of the trailer and being provided with a manual and power steering arrangement which permits simple and ready manipulation of the apparatus at its place of use.

These and other objects and advantages will be more apparent from the following disclosure when taken in conjunction with the drawings, which form a part thereof, and wherein:

Figure 6 is a view similar to Figures 3, 4 and 5, showing the device as having deposited the trailer shown in broken lines upon the loading surface of a flatcar;

Broadly, the invention comprises a body mounted for vertical adjustment on a plurality of lifting jacks or cylinders, said body being substantially U-shape or horseshoe shape and of a size whereby the trailer may be positioned within the confines thereof, said cylinders being supported on the ground by a pair of motor driven rear wheel units and a pair of non-driven front wheel units, a pair of jack-wheel units on said body normally raised from the ground and adapted for engagement on the top surface of the conventional railway flatcar, means for driving said rear wheel units and for steering the front and rear wheel units, a plurality of lifting forks adjustably mounted on said body, said forks being adapted to engage the rear tires of a trailer and pedestal means on which the kingpin of the trailer rests, means to operate the lifting cylinders whereby the body, forks, and trailer is elevated from the ground, means including additional cylinders or jacks for elevating and lowering the jack-wheels with respect to the deck of a flatcar, and means for elevating from the ground said non-driven wheels when said jack-wheels are supported on the flatcar. The method of loading and unloading a trailer laden with freight upon and from a railway flatcar by using the present apparatus or machine comprises the steps of placing the rear wheels and the kingpin pedestal of the trailer on lifting members or carriers of the machine and maneuvering the apparatus whereby the trailer is within the confines of the body thereof, elevating the lifting members together with the body of the machine and the trailer from the ground to a height at least as great as the height of the conventional flatcar, driving the apparatus to a position whereby the trailer is in an area longitudinally parallel to its desired location on one of a plurality of coupled flatcars, elevating, if necessary, the jack-wheel units to a position above the height of the top of the flatcar, moving the apparatus forwardly transversely of the flatcar until the jack-wheel units are over a portion of the flatcar, lowering the jack-wheel units into engagement with the top surface of the flatcar, elevating the non-driven wheel units to at least the height of the flatcar, whereby the trailer is supported by the jack-wheel units and the driven wheel units, moving the apparatus further forward transversely whereby the trailer is moved bodily sidewise while being maintained level, lowering the non-driven wheel units onto the flatcar deck whereby the load of the trailer is again maintained by the non-driven and driven wheel units, moving the apparatus still further forwardly transversely of the flatcar until the non-driven wheel units are positioned at the extreme side of the flatcar and the jack-wheel units may have become disengaged from the deck, lowering and elevating the trailer into and from proper position on the deck, commencing moving the apparatus rearwardly transversely of the flatcar whereby the jack-wheel units again engage the deck to assume with the driven wheel units the weight of the machine, continuing the rearward transverse movement until the jack-wheel units are at the extreme front side of the flatcar, lowering the non-driven wheel units to ground, and continuing the return transverse movement of the machine until the jack-wheel units are cleared of the deck of the flatcar and the non-driven and driven units have again assumed the combined weight of the trailer and the machine.

Figure 1:
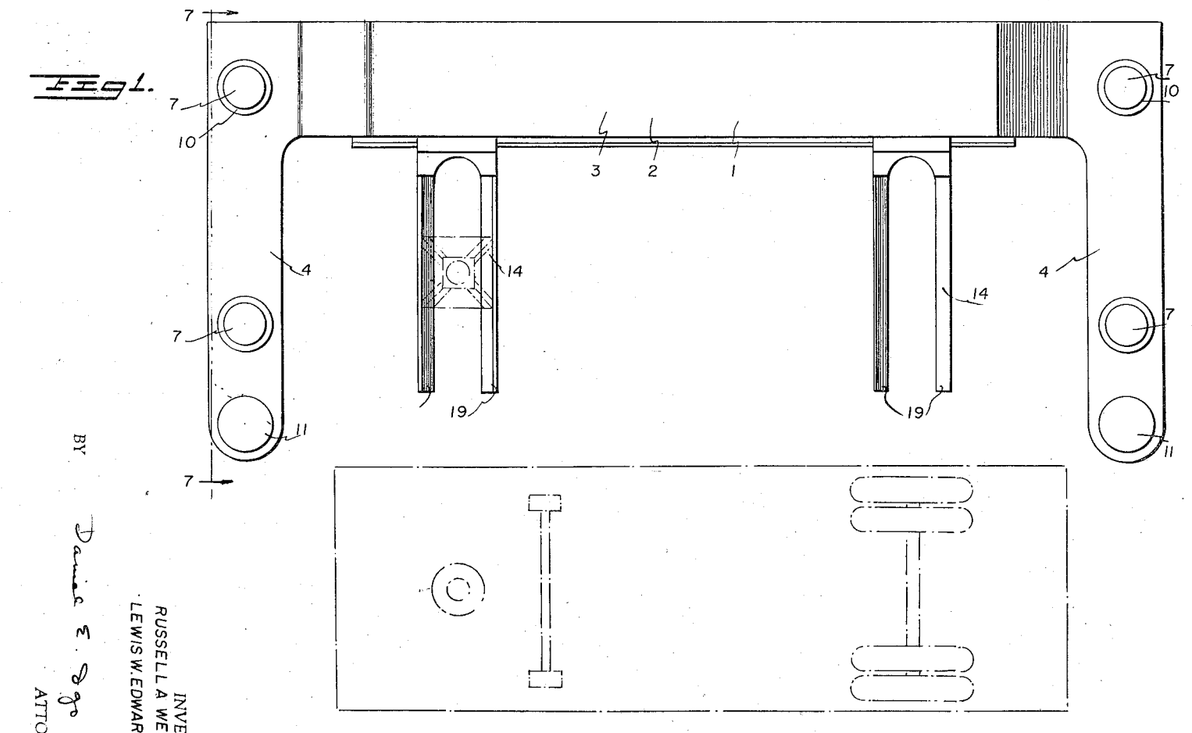
Figure 1 is a top plan view of the present invention, showing the lifting device in the withdrawn position and a trailer in broken lines.
Figure 2:
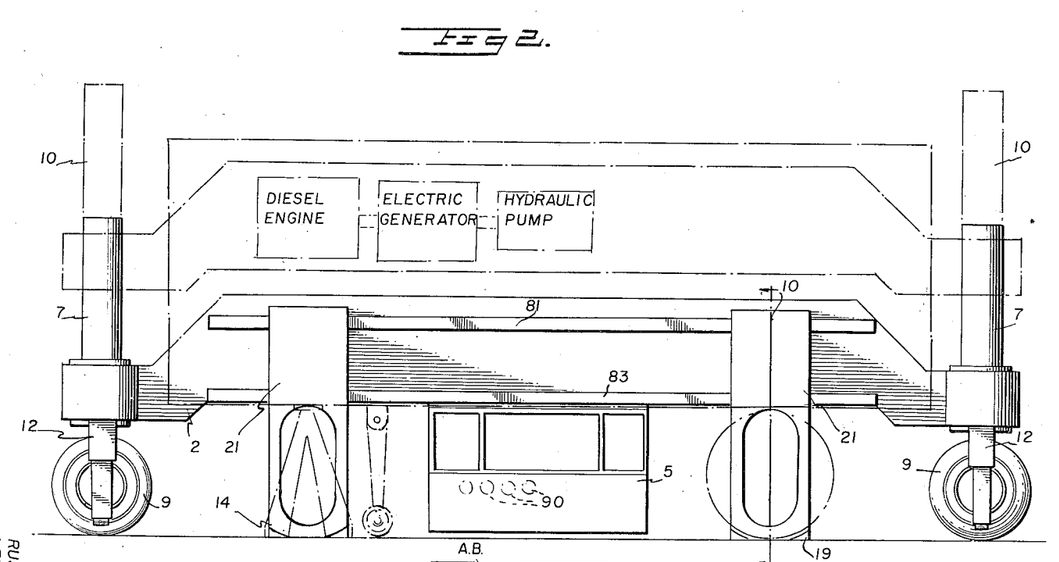
Figure 2 is a front elevation similar to Figure 1 but including in dotted lines an alternative position of part of the apparatus.

Referring to the drawings in detail, and particularly to Figures 1 through 6, inclusive, the apparatus of this invention is generally represented by the numeral 1 and comprises a body 2 having a main portion 3 and arm portions 4, portions 3 and 4 uniting as a substantial U-shaped formation. Depending from the portion 3 is the cab 5 where the operator of the machine is located to operate the various control valves and other such mechanism therein and shown diagrammatically in Figure 12. Within portion 3, as shown in dotted lines in Figure 2, is the source of power for operating the machine, and this may comprise, as shown, a prime mover diesel engine of about 170 H. P. at 1200 R. P. M. for driving an electric generator and a hydraulic pump. Power control of the machine will be by conventional diesel throttle control with battery excitation of the generator upon starting.

Each arm 4 has a tube 7 rotatably fixed or mounted thereon in suitable bearings, and non-rotatably fixed but slidable axially thereof in each tube 7 is a leg member 8 to which is secured a wheel unit structure 9 or 9A having a pair of tires 20. The non-driven wheel units are represented by numeral 9 and the driven units by 9A, and it is to be understood that all of the wheel units 9 and 9A may be motor driven. Fixed within each tube 7 is a cylinder of conventional type, and fixed to each leg 8 for operation within the cylinder in conventional manner by hydraulic or pneumatic means is a piston, the cylinders and pistons for raising and lowering legs 8 and tubes 7, together with body 1 with respect to legs 8, being shown in dotted lines in Figures 3 to 6, inclusive. The cylinders and pistons within tubes 7 provide with tubes 7 and legs 8, what will hereinafter be referred to as lifting cylinders 10.

Figure 7:
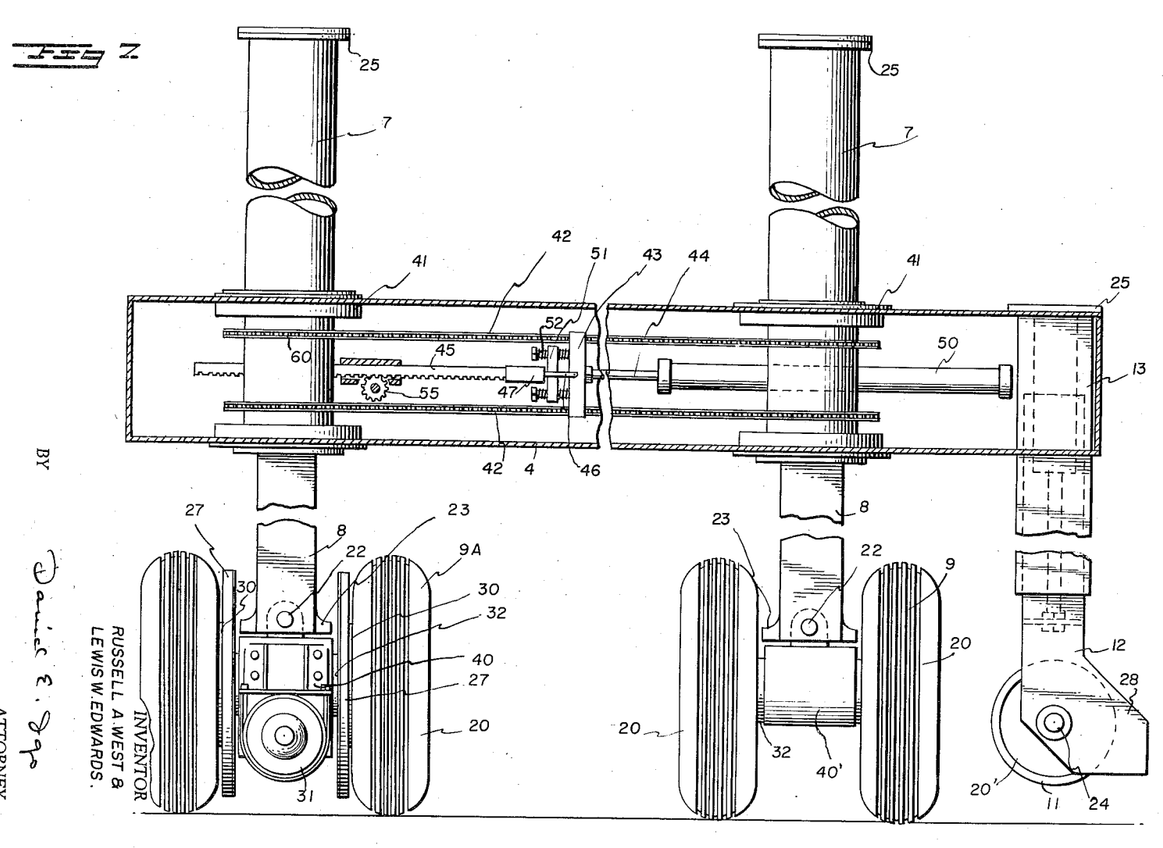
Figure 7 is an enlarged fragmentary sectional view taken along the lines 7—7 of Figure 1.

Also, mounted on portions 4 of body 2, are jack-wheel units 11, each of these wheel units being mounted on legs 12 adapted to be raised and lowered in tubes 13 by a conventional pneumatic or hydraulic cylinder and piston arrangement shown in dotted lines in Figure 7, said tubes 13 being fixed against rotation on arm portion 4. A suitable hydraulic circuit for operating each cylinder and piston of the jack-wheel units and the lifting cylinders, six as shown in the drawings, may be of the type disclosed in Figure 11, which will be further described hereinafter. Mounted for adjustment longitudinally with respect to portion 3 are a plurality of lifting fork members 14.

Further details of the parts will be described hereinafter but, for the purposes of the illustrations shown in Figures 1 through 6, it can be seen that the apparatus comprises a U-shaped portion 2 within the confines of which a semi-trailer is to be positioned, lifting cylinders 10, wheel units 9 and 9A for normally supporting the apparatus on the ground, lifting forks 14, a pair of jack-wheel units 11, and an operating cab 5. There is also provided means for steering wheel units 9 and 9A and for driving the rear wheel units 9A; that is, the wheels most adjacent the body portion 3. Also, as mentioned, necessary hydraulic mechanisms for operating the cylinders to elevate and lower the parts are provided.

Shown in dotted lines throughout Figures 1 to 6 inclusive is a highway semi-trailer having the conventional rear wheels, means for supporting the trailer body at the motor truck and a kingpin adapted to coact with a tractor, the details of the kingpin, rear wheels and axles being well known to those familiar with the trailer art.

For purposes of illustration only, the trailer, which is assumed laden with freight, is illustrated with only one rear axle, but it is to be understood that trailers having separate or tandem rear axles may readily be lifted by the present machine by merely providing an additional lift fork 14 for engagement with the undersurface of the additional trailer tires.

Figure 3:
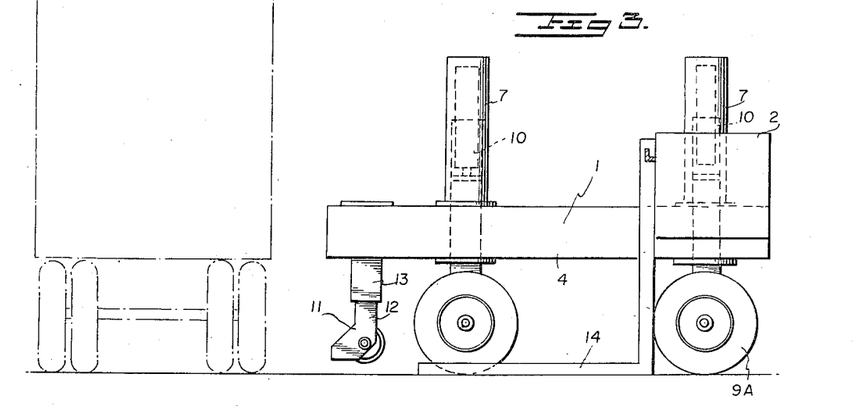
Figure 3 is a schematic side elevational view, showing the device in a similar position as in Figures 1 and 2.
Figure 4:
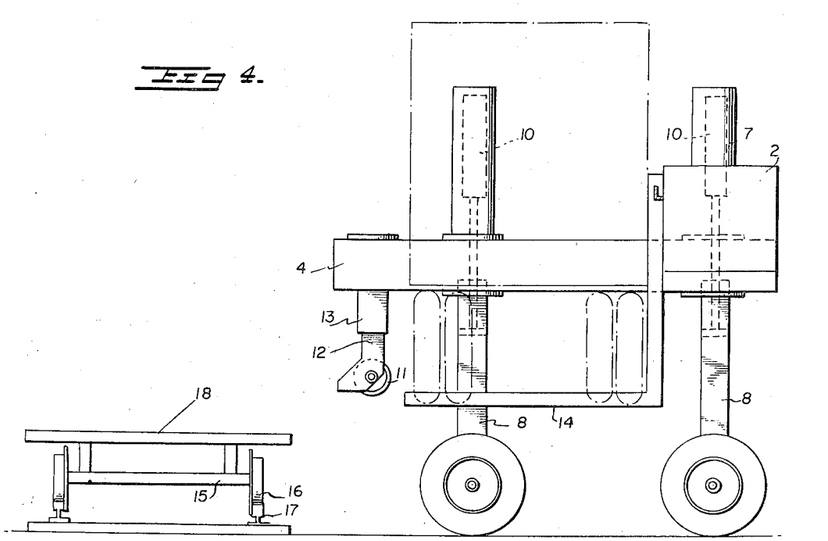
Figure 4 is a view similar to Figure 3, showing the device as having moved forward and having raised the trailer shown in broken lines and including the representation of a flatcar.
Figure 5:
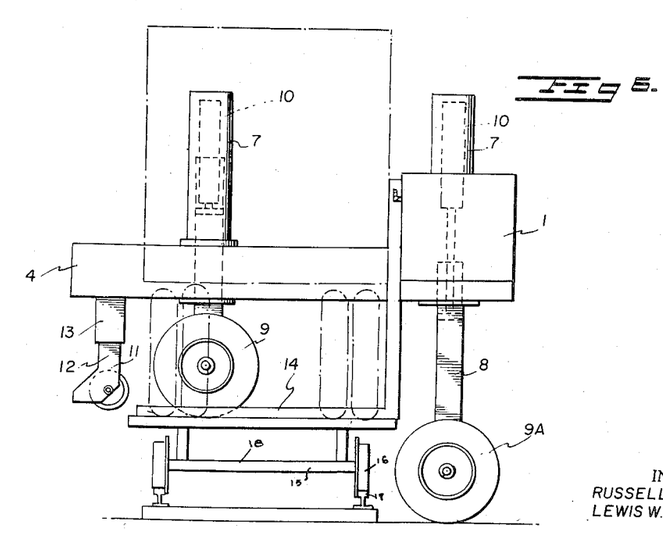
Figure 5 is a view similar to Figures 3 and 4, showing the present invention as having moved forward to engage the loading surface of a flatcar.

Also illustrated in Figures 4 through 6, is a standard railway car represented by the numeral 15. This car is provided with wheels 16 for engagement in a conventional manner on tracks 17, and the deck of the flatcar is shown at 18 as being of the flat type instead of depressed. The illustrations in Figures 3 to 6 inclusive are primarily for providing an overall picture of the operation, Figure 3 showing the side elevation of the present apparatus and the trailer in dotted lines, this being the normal position of the apparatus 1 when it is about to be moved into position for engaging the trailer. This position is also exemplified by the showing in Figure 2, and it can be seen that the lift arms 14 are positioned substantially on the ground with the cab portion spaced slightly thereabove. One of the lifting arms 14 is provided with a suitable pedestal, as shown in Figure 2, this pedestal being for the purpose of engaging the trailer kingpin and taking the place of the tractor fifth wheel. The type of pedestal illustrated may be provided in its upper surface with a slot or runway or the like, so that it may be slide into engagement with the kingpin.

The apparatus is then moved transversely forward whereby arms 4 surround the width of the semi-trailer having one rear axle and a fork 14 beneath the trailer tires; and the trailer is supported on the pedestal resting on the other lifting arm. The arms 19 of the forks 14 are spread apart sufficiently to permit straddle forking under a set of tires without having first to jack the trailer off the ground, the arms 19 being of concave contour conforming to the contour of the trailer tires. The arms 4 are designed to surround the trailer such that the center of the trailer is maintained at all times within the working body of the machine. Having the trailer within the confines of the body eliminates the necessity for counterweights as is usually required with cantilever type lifting devices now in use, and the like.

The lifting cylinders 10 are now operated, and this results in the body 2, the lifting arms 14, and trailer being elevated to, for example, a position shown in Figure 4. It is to be noted that the jack-wheel units are also raised by this operation and are positioned above the height of the flatcar top deck 18; although the jack-wheel units may be operated independently to alter their height. The apparatus 1 is then driven transversely forward until it assumes a position such as shown in Figure 5. At that time, the jack-wheel units 11 are lowered by operating their cylinders and pistons, until they engage the surface 18, and at this time, the front non-driven wheel units 9 may be elevated to at least the height of the flatcar deck 18 by operating the pistons within their cylinders, this resulting in the rear or driven wheel units 9A and the jack-wheel units 11 functioning to support the machine 1 and the trailer. Further transverse movement of the machine takes place, and when the non-driven wheel units 9 are over the platform 18, they are lowered to engage the deck of the flatcar and, when jack-wheel units become disengaged from the flatcar surface 18 as shown in Figure 6, the non-driven wheel units 9, together with the driven wheel units 9A, again provide the sole support for the entire load.

When the trailer is properly positioned over its intended location on the flatcar 15, it is lowered into position, as is also shown in Figure 6, and thereafter lashing or securing of the trailer to the flatcar takes place. For example, the usual chocks or wedges for holding the trailer tires in position may then be employed, and the front and rear of the trailer may be lashed down by chains or the like. The apparatus 1 is then withdrawn and the jack-wheel units and front non-driven wheel units 9 alternately assume with the driven wheel units 9A, the weight of the machine by their engagement on the deck 18 of the flatcar until the apparatus 1 reaches a position such as shown in Figure 3. In unloading trailers from flatcars, the process is the same as in connection with removing the machine from the flatcar after loading.

The above, in brief, constitutes the manner in which the present machine operates, and Figures 3 to 5 are intended to depict the operation of this machine in connection with loading and unloading a freight-laden trailer onto and from a flatcar. It is to be understood that the present machine is not intended to be limited to this particular use, however, as the design permits picking up and transferring longitudinally or transversely and loading onto a flatcar or other platform, any automobile truck with two or three axles, a two-axle full trailer, any piece of farm or road machinery and other types of vehicles and the like. Also, the machine may be readily adapted, as is believed apparent, to handle large packages, stacks of plates, bundles of pipe, structural steel, lumber and the like, and other types of especially long and heavy material. Still further, it is obvious that the present invention may be used in connection with hauling, loading, and unloading reels, coils, tanks, tank heads, and many other pieces of equipment.

Concerning the operation, especially in connection with loading and unloading the trailers onto and from flatcars, it is to be noted that in use, a railroad terminal need be provided with one or two of the present machines. Generally, a plurality of coupled flatcars are brought into a terminal and positioned at the location where loading is to take place and at a suitable distance therefrom, the truck tractors may deposit the trailers. The present machine may be readily manipulated, so that it is a relatively simple matter, is speedy, requires only minimum employees to manipulate into position for picking up a selected trailer at its location and delivering it to a selected one of a plurality of coupled flatcars.

In traveling about the terminal yards, the body 2 of the machine will be raised, as shown in Figures 2 and 3, a foot or more above the ground, so that proper ground clearance will be maintained for the lifting forks 14 and the cab 5. After the machine is driven alongside the trailer, the operator will adjust the arms 21 of the forks 14 laterally with respect to the body portion 3, depending upon the location of the trailer wheels and kingpin. After lifting, the net weight of the machine may be determined by means of the gauges in the cab compartment, these gauges being connected, in a conventional manner, with the oil under pressure within the lifting cylinders 10 and thereby functioning as oil pressure gauges. The ability to determine the weight of not only the machine itself, but the machine when supporting the trailer, is highly important in this type of industry, as the weights must be available for tariff purposes. After the trailer is picked up by the apparatus 1, and takes the form shown in Figure 4, the weight of the trailer per se may be determined on the pressure gauges by combining the weight of the apparatus and the trailer and deducting the weight of the apparatus therefrom.

During the operation previously described, it was mentioned that jack-wheel units 11 should be elevated or lowered during its travel on and over the deck 18. However, it is to be understood that once the elevation of the jack-wheels 11 are equal to the elevation with respect to ground of the upper surface of deck 18, no further raising or lowering of the jack units 11 need be made but instead, the units 11 may glide on and off the deck 18 during forward and rearward transverse movement of the machine 1.

Heretofore, the invention has been described rather broadly and reference has been primarily made to pictorial illustrations in the drawing. As to the details of some of the machine, reference is made in particular to Figures 7 to 11, inclusive.

Figure 7 discloses one pair of driven wheel units 9 and 9A and a jack-wheel unit 11, each of the units 9 and 9A having a pair of tires 20 and each jack unit having a wheel member 20' mounted in conventional manner on an axle 24, the tires 20 being extra large tires mounted on wheel rims, and the wheel 20', for example, being of solid rubber or metal. It is to be noted that the wheel units 9 and 9A are pivotally secured to their respective leg members 8 at 22, and the purpose of such a pivot is to permit one of the tires of each pair of wheel units to be elevated slightly with respect to the other and to generally account for uneven contour and terrains over which the apparatus travels. The amount of pivoting action of the units is limited by stops 23 contacting the housing 40 and/or 40'.

The lifting cylinders 10 and the jack units 11 are each provided with cover members or plates generally represented by numeral 25 for joining or connecting the cylinders with tubes 7 and 13. Also, it is to be noted that the leg member 12 of each jack-wheel unit 11 is provided with a guard 28 over-hanging the wheel 20 for the purpose of preventing the jack-wheel unit from running completely off the top surface of the flatcar during rearward transverse movement with the non-driven wheel units 9 in elevated position.

As to the type of drive for the driven wheel units 9A, a variable voltage traction type electric motor, preferably of constant torque developing 60 H. P. at 5,000 R. P. M. is employed, and this motor 31 is supported by any suitable housing means 40 on the wheel axle assemblies 32, there being a separate motor for each of the driven units 9A. The internal gear for driving is shown at 27, said gear being attached to the wheel of tire 20 by means of a flanged member 30, and each motor 31, which is powered by the generator shown in dotted lines in Figure 2, drives both of its wheels 20 by a spur gear reduction and differential unit employing standard automotive parts. Details of the differential and gear reduction within the housing 40 are not shown, as conventional arrangements will be satisfactory for use. Also, all tires 20 are equipped with air brakes of the usual type and with standard axle assemblies 32 and wheel and hub assemblies, an axle housing 40' being shown in connection with units 9.

Figure 8:
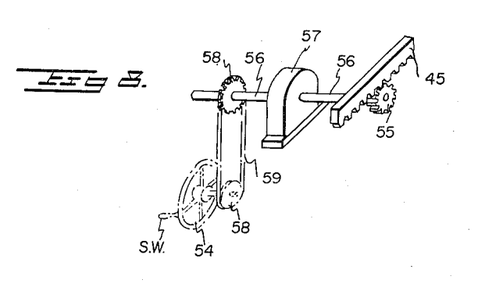
Figure 8 is a diagrammatic view of the manual drive for steering.
Figure 9:
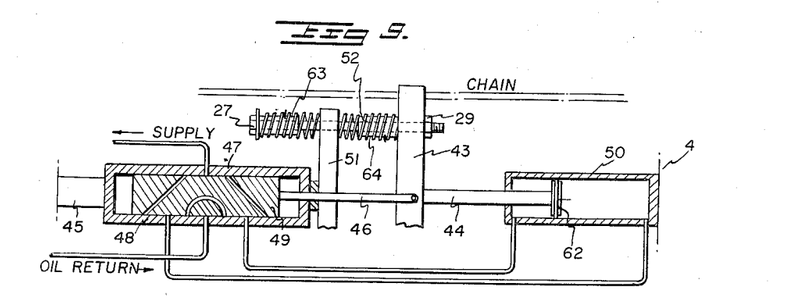
Figure 9 is a view of the hydraulic circuit for the power steering.

As to the manual and power steering incorporated with this invention, reference is made to Figures 7, 8 and 9. Each tube 7 is rotatably fixed in the bearings 41 of end frame portion 4, the legs 8 being non-rotatably but axially slidable within tube 7. Permanently connected to tubes 7 in each body portion 4 are sprockets 60 over which chains 42 are trained, the chains being yoked together by yoke 43. The rod 44, which operates the plunger or piston 62 within cylinder 50 connected to end frame 4, is also permanently connected to yoke 43. A rack 45 is also connected to yoke 43 through piston arm or rod 46 of valve 47 having cylinder 48 and piston 49. The valve 47 is permanently fixed to a second yoke or member 51 which coacts with the yoke 43 by means of springs 52 and bolts 27 and 29. The supply and return passages for the oil in connection with cylinders 50 and 47 is illustrated. As shown in Figure 9, sleeves or parts 63 and 64, respectively, of bolts 27 and 29 are spaced substantially equidistant on the right and left of member 51 whereby compression of springs 52 may take place upon movement of member 51 to the right or left until member 51 directly engages the shoulders of sleeves 63 or 64.

Manual steering is effected as follows: handwheel 54 operates rack 45 through pinion 55, shaft 56, gear reduction unit 57, sprockets 58 and chain 59. Assuming rack 45 is moved to the right in the drawing, cylinder 48 and member 51 will also be moved to the right and so will yoke 43 upon engagement of member 51 with sleeves 64 which thereby result in movement of the chains 52 and rotation of tubes 7 since yoke 43 is connected to the steering chains 42.

Figure 11:
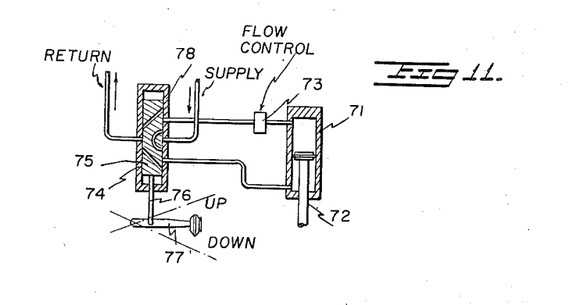
Figure 11 is a view of a hydraulic circuit that may be used in connection with the lifting and jack-wheel cylinders.

Referring to Figure 9, and in the same connection, Figure 11, the fluid paths shown are adapted to be connected in a fluid circuit depending upon the positions of pistons 49 and 75, respectively, within cylinders 48 and 74. The circuits are believed to be obvious from the drawings and, for example, the arcuate paths shown in both pistons 49 and 75 are adapted to be connected with the return line and supply lines respectively and one of the two lines connecting with cylinders 50 and 71.

Power steering is effected by means of valve 47, cylinder 50, operating plungers 44 and 46, both of the latter being affixed to yoke 43. For example, upon said manual movement of rack 45 to the right, cylinder 47 is also moved to the right with respect to piston 49 and, as illustrated, at about the time member 51 commences to engage sleeves 64 (this may be varied by merely altering dimensions), the fluid circuits are lined up to cause fluid to be injected in cylinder 50 to the left of piston 62 to provide a "kicking" effect to move parts such as 43, 44 and 46 to the right. Accordingly, steering on the part of rack 45 forward or in reverse causes compression of springs 52 and provides the relative movement between member 51 and yoke 43 which, in turn, causes proper operation of valve 47 and the latter, in turn, controls cylinder 50 which effects the power steering. It is clear that rotation of tubes 7 to the right or left causes a similar rotation of legs 8 and thereby the tires 20.

Figure 12:
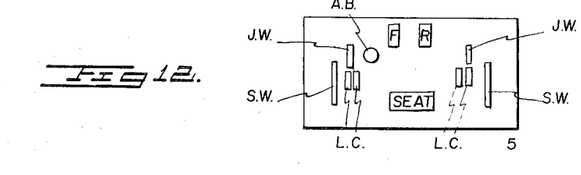
Figure 12 is a diagrammatic view of the operator's cab.

Figure 11 discloses a typical circuit for use in connection with each lifting wheel unit 10 or jack-wheel unit 11, and comprises the cylinder 71 within the tubular members 7 and 13, the operating plungers or pistons 72 which are secured to leg members 8 and 12, conventional flow control means 73, supply, return, and flow lines as indicated, valve 74 comprising cylinder 78 operating plunger 75, and rod 76 connecting to the operating plunger 75, and the manual operating arm 77 positioned within the cab 5. Referring to Figure 12, LC represents four lifting cylinder controls 77, and JW represents jack unit controls 77. The four lifting units within the tubes 7 will preferably be controlled by four valves and four flow control units, which may be operated separately or in unison whereby, by the use of the latter, a lifting effect is maintained. Separate or unison control of each of the controls 77 for the jack-wheel units may be employed.

Figure 10:
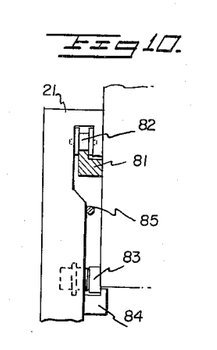
Figure 10 is a sectional view taken along the lines 10—10 of Figure 2, showing the mounting of a lifting arm.

As shown in Figures 10 and 2, attached to body 2 at portion 3 for supporting each lifting fork unit 14 is a track or guide 81 upon which the arm bracket 21 will travel on rollers 82. Other rollers, shown in dotted lines, on bracket 21 will roll on track 83, further stabilizing the bracket 21. A lug 84 secures the bracket 21 against derailment, and each bracket 21 will be moved along the tracks by, for example, means of a cable or chain 85 driven by an electric motor and gear reduction means (not shown). The lifting forks 14 per se are secured to the bracket arms 21 by any suitable means as shown.

Referring to cab 5, Figure 12 is a diagrammatical view thereof with letters F and R, respectively, representing the forward and reverse foot accelerator adapted to be operated by the feet of the driver when sitting on the seat shown in Figure 12. The air brake for each drive unit is designated by the letters AB and the manual steering wheels are indicated by the letters SW. As to the hydraulic weight meters 90, any suitable type may be employed and they are positioned within the cab 5 so that they are within vision of the driver when he is in the operator's seat.

For safety purposes, it is to be understood that certain flange pieces will be mounted to the wheels of the tires 20 to prevent complete deflation thereof in the event of a blowout. Also, the four lifting cylinder units 10 will be so interlocked hydraulically that if, by chance, one is not supplied with fluid or has a fluid leak, all four will still remain at a constant height, thereby preventing damage that normally might occur without such interlocking means. Other provisions effecting safety may be applied where required.

Referring to Figure 2 of the drawings, the pedestal shown in dotted lines is indicated as being supported by the lifting forks at the left of the machine. In the event the trailer is reversed one hundred and eighty degrees, it is merely necessary to place the pedestal on the forks shown as on right of the cab portion 5. As to placing the trailer on the flatcar deck, it may be positioned thereon from either side of the flatcar and with the ends of the trailer in one direction or the other with respect to the longitudinal plane of the flatcar.

For convenience, the entire apparatus should be provided with a lighting system, preferably including spot lights, and such system may be operated from the cab 5 for permitting operations in the dark. Due to the wheel units 9 and 9A being secured to the lifting cylinders, it is clear that changing a tire 20 would be a relatively simple matter. In addition to utilizing the present apparatus for loading and unloading freight laden trailers or the like onto and from flatcars of the conventional or depressed type when the cars are positioned on tracks at ground level, it is clear that the apparatus may be utilized wherein the car deck is about at ground level which would be the case in connection with a depressed track. As to flat cars of the depressed type, they are enjoying considerable commercial use due to the regulations regarding the overall height of the equipment and flatcar. In other words, the present apparatus is designed so that it may be easily adapted for use in connection with conventional flatcars, cars of the depressed type, or both of the latter when used in connection with depressed tracks and the use of the present application in connection with each is believed obvious.

The above description and drawings disclose several embodiments of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

Having thus described the invention, what is claimed as new and what is desired to be secured by Letters Patent is:

1. Apparatus for lifting semi-trailers or the like and moving the trailers bodily sidewise onto a railway flatcar or the like comprising a body of substantial U-shape having a base portion and two arm portions whereby a trailer may be maintained within the confines of said body, a pair of lifting cylinder units on each arm for raising and lowering said body with respect to ground, said body having lifting forks for elevating and lowering the trailer, a jack-wheel unit on each arm forward of said cylinder units with respect to said base portion, said units having wheels, means to elevate and lower each of said units, means to drive the wheels of at least a pair of said lifting units and means to steer the wheels of the lifting units.

2. Apparatus for lifting heavy pieces onto a platform or the like comprising a body of a shape whereby the piece lifted will be within the confines thereof, lifting cylinder units for raising and lowering said body with respect to ground, lifting forks on said body, jack-wheel unit means on said body, said units having wheels, drive means for driving the apparatus over the ground and means to elevate and lower said units with respect to ground whereby said apparatus may be supported by said lifting cylinder units in one position and by some of said lifting cylinder units and said jack-wheel units in another position, said jack-wheel units being positioned on the platform and some of said lifting cylinder units being elevated from ground when said apparatus is supported as last mentioned.

3. Apparatus for lifting semi-trailers or the like from the ground onto a platform such as a railway flatcar, comprising a body having a base portion and a pair of arm portions forming a substantial U-shape, a pair of lifting cylinder units on each arm for raising and lowering said body with respect to ground, lifting forks on said base portion, said units being positioned in tandem on each arm so that they are forward and rearward of each other with respect to said base portion, a jack-wheel unit on each arm forward of said forward cylinder units with respect to said base portion, each of said units having wheels, means to elevate and lower each of said units, said apparatus normally being supported from the ground by the wheels of said lifting units, means to drive said apparatus over the ground whereby said jack wheel units may be lowered onto the platform and said forward cylinder units elevated from the ground so that the apparatus is supported from the ground by the jack-wheel units on the platform and the wheels of the rearward lifting units.

4. Apparatus as defined in claim 3, wherein said units are actuated by hydraulically operated pistons and cylinders.

5. Apparatus as defined in claim 3, wherein means is provided for steering the wheels.

6. Apparatus as defined in claim 5, wherein said steering means comprises sprockets secured to said lifting units and chains connecting the sprockets on each arm together, yoke means secured to said chains, and manual and power means including hydraulic actuating means for operating said chains.

7. Apparatus as defined in claim 3, wherein each jack-wheel unit is provided with a guard overhanging the wheel thereof.

8. Apparatus as defined in claim 3, wherein said lifting forks are adjustably mounted on said base portion, the means for adjusting including tracks on said base portion for the reception of fork rollers.

References Cited in the file of this patent

UNITED STATES PATENTS

| | | |
|---|---|---|
| 1,802,010 | Fitch | Apr. 21, 1931 |
| 1,872,714 | Farley | Aug. 23, 1932 |
| 1,875,052 | Ljungkull | Aug. 30, 1932 |
| 2,004,095 | Hankins et al. | June 11, 1935 |
| 2,061,495 | Woodruff | Nov. 17, 1936 |
| 2,422,538 | Framhein | June 17, 1947 |
| 2,526,282 | Sanmori | Oct. 17, 1950 |
| 2,598,151 | Warshaw | May 27, 1952 |
| 2,621,811 | Lull | Dec. 16, 1952 |
| 2,621,812 | Lull | Dec. 16, 1952 |
| 2,629,507 | Olson | Feb. 24, 1953 |
| 2,647,647 | Alimanestiano | Aug. 4, 1953 |
| 2,667,980 | Dawson | Feb. 2, 1954 |

OTHER REFERENCES

Publication — Seattle Post-Intelligence — March 28, 1947, p. 21.

Publication—Newsweek—March 31, 1952, p. 42.

Publication—Mechanix Illustrated—October 1952, p. 89.